US008540567B2

(12) United States Patent
Nelson et al.

(10) Patent No.: US 8,540,567 B2
(45) Date of Patent: Sep. 24, 2013

(54) GAMING SYSTEM, GAMING DEVICE AND METHOD FOR MODERATING REMOTE HOST INITIATED FEATURES FOR MULTIPLE CONCURRENTLY PLAYED GAMES

(75) Inventors: Dwayne R. Nelson, Las Vegas, NV (US); William R. Brosnan, Reno, NV (US); Kevin M. Higgins, Reno, NV (US); William Chad Little, Las Vegas, NV (US); Larry R. Hollibaugh, Reno, NV (US); Erik B. Petersen, Reno, NV (US); Adrian R. Marcu, Reno, NV (US)

(73) Assignee: IGT, Las Vegas, NV (US)

( * ) Notice: Subject to any disclaimer, the term of this patent is extended or adjusted under 35 U.S.C. 154(b) by 215 days.

(21) Appl. No.: 13/247,520

(22) Filed: Sep. 28, 2011

(65) Prior Publication Data

US 2013/0079115 A1 Mar. 28, 2013

(51) Int. Cl.
*A63F 13/00* (2006.01)

(52) U.S. Cl.
USPC .............................................. 463/25; 463/29

(58) Field of Classification Search
USPC .......................................... 463/25, 26, 29, 43
See application file for complete search history.

(56) References Cited

U.S. PATENT DOCUMENTS 4,448,419 A 5/1984 Telnaes
4,467,424 A 8/1984 Hedges et al.
4,621,814 A 11/1986 Stepan et al.
4,669,730 A 6/1987 Small
4,679,143 A 7/1987 Hagiwara
4,695,053 A 9/1987 Vazquez, Jr. et al.
4,743,002 A 5/1988 Menzel
4,838,552 A 6/1989 Hagiwara
4,856,787 A 8/1989 Itkis
4,874,173 A 10/1989 Kishishita
4,922,522 A 5/1990 Scanlon
4,926,327 A 5/1990 Sidley
4,991,848 A 2/1991 Greenwood et al.
5,019,973 A 5/1991 Wilcox et al.

(Continued)

FOREIGN PATENT DOCUMENTS

GB 2 098 778 11/1982
GB 2 161 008 1/1986

(Continued)

OTHER PUBLICATIONS

International Search Report and Written Opinion of the International Searching Authority for related PCT Application No. PCT/US2012/53786, dated Nov. 29, 2012 (8 pages).

(Continued)

*Primary Examiner* — Arthur O. Hall
*Assistant Examiner* — Allen Chan
(74) *Attorney, Agent, or Firm* — Neal, Gerber & Eisenberg LLP

(57) ABSTRACT

The gaming system disclosed herein enables a player to simultaneously or concurrently play a plurality of games at a gaming device regardless or independent of if the gaming device accounting system in communication with the gaming device is configured to support such simultaneous or concurrent game play. The gaming system disclosed herein additionally or alternatively enables a player to simultaneously play a plurality of games wherein certain of the games are eligible to operate with a remote host and certain of the games are ineligible to operate with the remote host.

20 Claims, 9 Drawing Sheets

(56) References Cited

U.S. PATENT DOCUMENTS

| | | | |
|---|---|---|---|
| 5,116,055 | A | 5/1992 | Tracy |
| 5,152,529 | A | 10/1992 | Okada |
| 5,159,549 | A | 10/1992 | Hallman, Jr. et al. |
| 5,178,390 | A | 1/1993 | Okada |
| 5,179,517 | A | 1/1993 | Sarbin et al. |
| 5,209,476 | A | 5/1993 | Eiba |
| 5,248,142 | A | 9/1993 | Breeding |
| 5,249,800 | A | 10/1993 | Hilgendorf et al. |
| 5,259,613 | A | 11/1993 | Marnell, II |
| 5,275,400 | A | 1/1994 | Weingardt et al. |
| 5,277,424 | A | 1/1994 | Wilms |
| 5,288,081 | A | 2/1994 | Breeding |
| 5,324,035 | A | 6/1994 | Morris et al. |
| 5,342,047 | A | 8/1994 | Heidel et al. |
| 5,344,144 | A | 9/1994 | Canon |
| 5,370,399 | A | 12/1994 | Liverance |
| 5,371,345 | A | 12/1994 | LeStrange et al. |
| 5,377,973 | A | 1/1995 | Jones et al. |
| 5,390,934 | A | 2/1995 | Grassa |
| 5,393,061 | A | 2/1995 | Manship et al. |
| 5,393,067 | A | 2/1995 | Paulsen et al. |
| 5,395,111 | A | 3/1995 | Inoue |
| 5,395,242 | A | 3/1995 | Slye et al. |
| 5,397,128 | A | 3/1995 | Hesse et al. |
| 5,411,258 | A | 5/1995 | Wilson et al. |
| 5,415,416 | A | 5/1995 | Scagnelli et al. |
| 5,450,938 | A | 9/1995 | Rademacher |
| 5,470,079 | A | 11/1995 | LeStrange et al. |
| 5,472,194 | A | 12/1995 | Breeding et al. |
| 5,544,892 | A | 8/1996 | Breeding |
| 5,564,700 | A | 10/1996 | Celona |
| 5,569,084 | A | 10/1996 | Nicastro et al. |
| 5,570,885 | A | 11/1996 | Ornstein |
| 5,580,309 | A | 12/1996 | Piechowiak et al. |
| 5,584,764 | A | 12/1996 | Inoue |
| 5,593,349 | A | 1/1997 | Miguel et al. |
| 5,609,524 | A | 3/1997 | Inoue |
| 5,611,730 | A | 3/1997 | Weiss |
| 5,639,088 | A | 6/1997 | Schneider et al. |
| 5,655,961 | A | 8/1997 | Acres et al. |
| 5,673,917 | A | 10/1997 | Vancura |
| 5,674,128 | A | 10/1997 | Holch et al. |
| 5,697,843 | A | 12/1997 | Manship et al. |
| 5,704,835 | A | 1/1998 | Dietz, II |
| 5,707,286 | A | 1/1998 | Carlson |
| 5,722,891 | A | 3/1998 | Inoue |
| 5,759,103 | A | 6/1998 | Freels et al. |
| 5,761,647 | A | 6/1998 | Boushy |
| 5,770,533 | A | 6/1998 | Franchi |
| 5,775,692 | A | 7/1998 | Watts et al. |
| 5,788,574 | A | 8/1998 | Ornstein et al. |
| 5,816,915 | A | 10/1998 | Kadlik |
| 5,839,730 | A | 11/1998 | Pike |
| 5,890,962 | A | 4/1999 | Takemoto |
| 5,947,820 | A | 9/1999 | Morro et al. |
| 5,951,397 | A | 9/1999 | Dickinson |
| 5,967,896 | A | 10/1999 | Jorach et al. |
| 5,984,779 | A | 11/1999 | Bridgeman et al. |
| 5,984,782 | A | 11/1999 | Inoue |
| 6,001,016 | A | 12/1999 | Walker et al. |
| 6,012,982 | A | 1/2000 | Piechiowiak et al. |
| 6,019,374 | A | 2/2000 | Breeding |
| 6,024,642 | A | 2/2000 | Stupak |
| 6,033,307 | A | 3/2000 | Vancura |
| 6,039,648 | A | 3/2000 | Guinn et al. |
| 6,056,641 | A | 5/2000 | Webb |
| 6,068,552 | A | 5/2000 | Walker et al. |
| 6,077,162 | A | 6/2000 | Weiss |
| 6,149,522 | A | 11/2000 | Alcorn et al. |
| 6,159,095 | A | 12/2000 | Frohm et al. |
| 6,186,894 | B1 | 2/2001 | Mayeroff |
| 6,190,255 | B1 | 2/2001 | Thomas et al. |
| 6,203,427 | B1 | 3/2001 | Walker et al. |
| 6,210,279 | B1 | 4/2001 | Dickinson |
| 6,227,969 | B1 | 5/2001 | Yoseloff |
| 6,227,971 | B1 | 5/2001 | Weiss |
| 6,234,900 | B1 | 5/2001 | Cumbers |
| 6,254,481 | B1 | 7/2001 | Jaffe et al. |
| 6,264,561 | B1 | 7/2001 | Saffari et al. |
| 6,270,412 | B1 | 8/2001 | Crawford et al. |
| 6,315,666 | B1 | 11/2001 | Mastera et al. |
| 6,319,125 | B1 | 11/2001 | Acres |
| 6,336,857 | B1 | 1/2002 | McBride |
| 6,361,441 | B1 | 3/2002 | Walker et al. |
| 6,379,248 | B1 | 4/2002 | Jorasch et al. |
| 6,394,907 | B1 | 5/2002 | Rowe |
| 6,413,162 | B1 | 7/2002 | Baerlocher et al. |
| 6,425,823 | B1 | 7/2002 | Byrne |
| 6,431,983 | B2 | 8/2002 | Acres |
| 6,443,841 | B1 | 9/2002 | Rossides |
| 6,461,241 | B1 | 10/2002 | Webb et al. |
| 6,517,073 | B1 | 2/2003 | Vancura |
| 6,523,829 | B1 | 2/2003 | Walker et al. |
| 6,549,912 | B1 | 4/2003 | Chen |
| 6,554,709 | B1 | 4/2003 | Brenner et al. |
| 6,579,179 | B2 | 6/2003 | Poole et al. |
| 6,595,855 | B2 | 7/2003 | Sako |
| 6,607,195 | B2 | 8/2003 | Vancura |
| 6,607,441 | B1 | 8/2003 | Acres |
| 6,652,378 | B2 | 11/2003 | Cannon et al. |
| 6,656,040 | B1 | 12/2003 | Brosnan et al. |
| 6,679,497 | B2 | 1/2004 | Walker et al. |
| 6,685,567 | B2 | 2/2004 | Cockerille et al. |
| 6,692,003 | B2 | 2/2004 | Potter et al. |
| 6,702,289 | B1 | 3/2004 | Feola |
| 6,722,985 | B2 | 4/2004 | Criss-Puszkiewicz et al. |
| 6,726,565 | B2 | 4/2004 | Hughs-Baird |
| 6,789,801 | B2 | 9/2004 | Snow |
| 6,804,763 | B1 | 10/2004 | Stockdale et al. |
| 6,832,957 | B2 | 12/2004 | Falconer |
| 6,835,134 | B2 | 12/2004 | Poole et al. |
| 6,837,788 | B2 | 1/2005 | Cannon |
| 6,860,810 | B2 | 3/2005 | Cannon et al. |
| 6,863,608 | B1 | 3/2005 | LeMay et al. |
| 6,866,586 | B2 | 3/2005 | Oberberger et al. |
| 6,991,538 | B2 | 1/2006 | Cannon |
| 7,029,395 | B1 | 4/2006 | Baerlocher |
| 7,111,845 | B2 | 9/2006 | Walker et al. |
| 7,156,735 | B2 | 1/2007 | Brosnan et al. |
| 7,201,654 | B1 | 4/2007 | Jarvis et al. |
| 7,297,059 | B2 | 11/2007 | Vancura et al. |
| 7,311,605 | B2 | 12/2007 | Moser |
| 7,329,179 | B2 | 2/2008 | Baerlocher |
| 7,341,518 | B2 | 3/2008 | Muskin |
| 7,351,146 | B2 | 4/2008 | Kaminkow |
| 7,594,851 | B2 | 9/2009 | Falconer |
| 7,611,411 | B2 | 11/2009 | Griswold et al. |
| 7,617,151 | B2 | 11/2009 | Rowe |
| 7,758,417 | B2 | 7/2010 | Jorasch et al. |
| 7,780,517 | B2 | 8/2010 | Saffari et al. |
| 7,806,764 | B2 | 10/2010 | Brosnan et al. |
| 7,901,294 | B2 | 3/2011 | Walker et al. |
| 7,927,212 | B2 | 4/2011 | Hedrick et al. |
| 7,988,549 | B2 | 8/2011 | Little |
| 7,988,551 | B2 | 8/2011 | Walker et al. |
| 8,016,679 | B2 | 9/2011 | Steil et al. |
| 8,157,633 | B2 | 4/2012 | Kaminkow |
| 2002/0025850 | A1 | 2/2002 | Hafezi |
| 2002/0077167 | A1 | 6/2002 | Merari |
| 2003/0027628 | A1 | 2/2003 | Luciano |
| 2003/0073497 | A1 | 4/2003 | Nelson |
| 2003/0137110 | A1 | 7/2003 | Huard et al. |
| 2003/0144053 | A1 | 7/2003 | Michaelson |
| 2003/0203756 | A1 | 10/2003 | Jackson |
| 2004/0002379 | A1 | 1/2004 | Parrott et al. |
| 2004/0043815 | A1 | 3/2004 | Kaminkow |
| 2004/0063492 | A1 | 4/2004 | Baerlocher et al. |
| 2004/0070146 | A1 | 4/2004 | Snow |
| 2004/0084843 | A1 | 5/2004 | Snow |
| 2004/0087369 | A1 | 5/2004 | Tanaka et al. |
| 2004/0090003 | A1 | 5/2004 | Snow |
| 2004/0090005 | A1 | 5/2004 | Snow |
| 2004/0106446 | A1 * | 6/2004 | Cannon et al. .................. 463/16 |
| 2004/0147314 | A1 | 7/2004 | LeMay et al. |

| | | | | |
|---|---|---|---|---|
| 2004/0152509 | A1 | 8/2004 | Hornik et al. | |
| 2004/0192431 | A1 | 9/2004 | Singer et al. | |
| 2004/0219968 | A1 | 11/2004 | Fiden et al. | |
| 2005/0054431 | A1 | 3/2005 | Walker et al. | |
| 2005/0085288 | A1 | 4/2005 | Schugar et al. | |
| 2005/0107158 | A1 | 5/2005 | Kanisawa et al. | |
| 2005/0153778 | A1 | 7/2005 | Nelson et al. | |
| 2005/0192099 | A1 | 9/2005 | Nguyen et al. | |
| 2005/0233794 | A1 | 10/2005 | Cannon et al. | |
| 2005/0233803 | A1 | 10/2005 | Yang | |
| 2005/0239542 | A1 | 10/2005 | Olsen | |
| 2006/0035707 | A1 | 2/2006 | Nguyen et al. | |
| 2006/0040732 | A1 | 2/2006 | Baerlocher et al. | |
| 2006/0046823 | A1 | 3/2006 | Kaminkow et al. | |
| 2006/0073882 | A1 | 4/2006 | Rozkin et al. | |
| 2006/0092019 | A1 | 5/2006 | Fallon | |
| 2006/0128457 | A1 | 6/2006 | Cannon | |
| 2006/0148547 | A1 | 7/2006 | Montgomery et al. | |
| 2006/0154722 | A1 | 7/2006 | Walker et al. | |
| 2006/0211473 | A1 | 9/2006 | Walker et al. | |
| 2006/0247010 | A1 | 11/2006 | Gagner | |
| 2006/0252508 | A1 | 11/2006 | Walker et al. | |
| 2006/0252546 | A1 | 11/2006 | Castellari et al. | |
| 2007/0054726 | A1 | 3/2007 | Muir et al. | |
| 2007/0060314 | A1 | 3/2007 | Baerlocher et al. | |
| 2007/0060321 | A1 | 3/2007 | Vasquez et al. | |
| 2007/0102877 | A1 | 5/2007 | Personius et al. | |
| 2007/0155482 | A1 | 7/2007 | Walker et al. | |
| 2007/0155483 | A1 | 7/2007 | Walker et al. | |
| 2007/0155484 | A1 | 7/2007 | Walker et al. | |
| 2007/0191088 | A1 | 8/2007 | Breckner et al. | |
| 2007/0202941 | A1 * | 8/2007 | Miltenberger et al. | 463/25 |
| 2007/0243925 | A1 | 10/2007 | LeMay et al. | |
| 2007/0265094 | A1 | 11/2007 | Tone et al. | |
| 2007/0273097 | A1 | 11/2007 | Kirkutis | |
| 2007/0293293 | A1 | 12/2007 | Baerlocher et al. | |
| 2007/0293306 | A1 | 12/2007 | Nee et al. | |
| 2008/0009334 | A1 | 1/2008 | Walker et al. | |
| 2008/0067745 | A1 | 3/2008 | Wikstrom | |
| 2008/0076496 | A1 | 3/2008 | Baerlocher et al. | |
| 2008/0076531 | A1 | 3/2008 | Baerlocher et al. | |
| 2008/0076532 | A1 | 3/2008 | Graham et al. | |
| 2008/0076542 | A1 | 3/2008 | Iddings et al. | |
| 2008/0102934 | A1 | 5/2008 | Tan | |
| 2008/0108425 | A1 | 5/2008 | Oberberger | |
| 2008/0146344 | A1 | 6/2008 | Rowe et al. | |
| 2008/0176635 | A1 | 7/2008 | Randall | |
| 2008/0182650 | A1 | 7/2008 | Randall et al. | |
| 2009/0111574 | A1 | 4/2009 | Rowe | |
| 2009/0203422 | A1 | 8/2009 | Ellis | |
| 2009/0209333 | A1 | 8/2009 | Kelly et al. | |
| 2010/0016062 | A1 | 1/2010 | Baerlocher | |
| 2010/0120506 | A1 | 5/2010 | Davis et al. | |
| 2010/0151937 | A1 * | 6/2010 | Tallal, Jr. | 463/25 |
| 2010/0197394 | A1 * | 8/2010 | Imachi et al. | 463/30 |
| 2010/0210353 | A1 | 8/2010 | Gagner et al. | |
| 2010/0210364 | A1 * | 8/2010 | York et al. | 463/43 |
| 2010/0248821 | A1 | 9/2010 | Jorasch et al. | |
| 2011/0045892 | A1 | 2/2011 | Vann et al. | |
| 2011/0111842 | A1 | 5/2011 | Walker et al. | |
| 2012/0202592 | A1 | 8/2012 | Sprinkle | |

FOREIGN PATENT DOCUMENTS

| | | | |
|---|---|---|---|
| WO | WO 96/09102 | | 3/1996 |
| WO | WO 99/10849 | A1 | 3/1999 |
| WO | WO 01/82245 | A2 | 1/2001 |
| WO | WO 02/099760 | A2 | 12/2002 |
| WO | WO 2005/079242 | A2 | 9/2005 |

OTHER PUBLICATIONS

Office Action from U.S. Appl. No. 13/247,540, dated Dec. 28, 2012.

Slot Accounting System, published by IGT printed prior to Sep. 28, 2011.

Traditional Game Integration vs. IGT RGS Games Integration, published by IGT, printed prior to Sep. 28, 2011.

* cited by examiner

GAMING SYSTEM, GAMING DEVICE AND METHOD FOR MODERATING REMOTE HOST INITIATED FEATURES FOR MULTIPLE CONCURRENTLY PLAYED GAMES

CROSS-REFERENCE TO RELATED APPLICATIONS

This application relates to the following co-pending commonly owned patent applications: "GAMING SYSTEM, GAMING DEVICE AND METHOD FOR REPORTING MULTIPLE CONCURRENTLY PLAYED GAMES," Ser. No. 13/247,513, and "GAMING SYSTEM, GAMING DEVICE AND METHOD FOR MODERATING REMOTE HOST INITIATED FEATURES FOR MULTIPLE CONCURRENTLY PLAYED GAMES," Ser. No. 13/247,540.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate a primary or base game. Certain known gaming machines enable a player to wager on and play a plurality of primary or base games simultaneously or concurrently. In many of these gaming machines, the award for each played primary game is based on the player obtaining a winning symbol or symbol combination and on the amount of the wager placed on that primary game (e.g., the higher the wager, the higher the award). Generally, symbols or symbol combinations which are less likely to occur usually provide higher awards.

Gaming machine accounting systems are also well known. Certain gaming machine accounting systems include one or more servers, controllers or remote hosts which are in secure communication with a plurality of gaming machines. These gaming machine accounting systems are configured to automate various metering and/or event reporting required of the play of the plurality of gaming machines. That is, various gaming machine accounting systems monitor, track, measure, record, store, and/or access various data associated with the gaming machines and/or the players playing the gaming machines. Such data typically includes statistical and/or financial information, such as coin-in statistics, coin-out statistics, coin drop statistics, win/loss statistics, jackpot statistics, cancelled credits statistics, paytable statistics, denomination statistics, and/or games played statistics. The monitoring of this statistical and/or financial information enables a gaming establishment operator to analyze the performance of the various gaming machines located at a gaming establishment and to analyze the individual games and paytables installed on such gaming machines.

While various known gaming machine accounting systems provide numerous reporting and analytical benefits for gaming establishment operators, certain known gaming machine accounting systems are configured to account for each gaming machine only playing one game at a time. That is, certain known gaming machine accounting systems are not configured to support a player at a gaming machine placing a plurality of wagers on a plurality of simultaneous or concurrent plays of a plurality of primary or base games and specifically placing a plurality of wagers on a plurality of concurrent plays of a plurality of different primary or base games. Specifically, certain known gaming machine accounting systems track gaming machines meters and also game change events. Such known gaming machine accounting systems post-process the data to determine the play on each paytable. To report concurrent plays of a plurality of different primary games, such gaming machines first need to report which primary game is currently being played and then allow sufficient time for the gaming machine accounting system to register a changed game play before reporting any plays of that game. However, due to the time differences between such reporting and such game change events (i.e., one known gaming machine accounting system may poll the gaming machines every two-hundred milliseconds while certain know gaming machines require 1.5 seconds to register a game change event), known gaming machine accounting systems often fall behind on such reporting and the post-processing of data and are thus not configured to account for a gaming machine playing a plurality of games at a time. Therefore, the gaming machines in communication with these known gaming machine accounting systems are unable to enable a player to wager on and play a plurality of primary or base games simultaneously. Accordingly, gaming establishment operators using these gaming machine accounting systems are unable to offer simultaneous game play features to players (compared to gaming establishment operators using gaming machine accounting systems that enable simultaneous game play) and are at a disadvantage to other gaming establishment operators using different gaming machine accounting systems.

Additionally, certain known gaming servers, gaming controllers or gaming remote hosts provide for various non-gaming machine initiated features or requests for the plurality of gaming machines. That is, certain gaming servers, gaming controllers or gaming remote hosts are configured to initiate one or more events, such as a request for information and/or a reconfiguration of a paytable, at one or more of the plurality of gaming machines in communication with these gaming servers, gaming controllers or gaming remote hosts. While these gaming server, gaming controller or gaming remote host initiated features or requests have certain advantages (such as an increased volatility for certain players that enjoy more volatile gaming experiences), these gaming server, gaming controller or gaming remote host initiated features or requests also have certain disadvantages (such as an increased volatility for certain other players that dislike more volatile gaming experiences). Additionally, certain of these gaming server, gaming controller or gaming remote host initiated features or requests interrupt a player's gaming experience, such as by causing the reels to spin for an extended period of time as requested information or data is being communicated back to the gaming server, gaming controller or gaming remote host. Moreover, these gaming server, gaming controller or gaming remote host initiated features or requests are difficult for gaming machine designers to account for when configuring gaming machines.

Accordingly, there is a continuing need to provide new and different gaming machines and gaming systems which operate with existing gaming machine accounting systems. There is also a continuing need to provide new and different gaming machines and gaming systems which minimize the affects of certain gaming server, gaming controller or gaming remote host initiated features or requests.

SUMMARY

The present disclosure relates generally to gaming systems, gaming devices, and methods for enabling a player to simultaneously, concurrently or overlappingly play a plurality of games at a gaming device regardless or independent of whether the gaming device accounting system in communication with the gaming device is capable of supporting such simultaneous or concurrent game play.

In various embodiments, the gaming system, gaming device and method disclosed herein enables a player to wager on and simultaneously, concurrently or overlappingly play a plurality of primary or base games. Following the completion of the play of these plurality of simultaneously played games, the gaming system reports the plays of these simultaneously games to the gaming device accounting system as a plurality of sequentially played games. That is, following the completion of each of the plurality of simultaneously played games (i.e., following the generation of an outcome for each game and the providing to a player of any award associated with the generated outcome for each game), the gaming system sequentially reports to a distinct gaming device accounting system the statistical and/or financial information related to each play of each of these simultaneously played games. Thus, the gaming system provides for the simultaneous play of a plurality of games to be presented to the gaming device accounting system (which is a separate and distinct system from the gaming system) as the sequential play of a plurality of games. For example, a gaming system enables a player to wager on and simultaneously or concurrently play four primary games. In this example, after the player has completed their play of all four wagered on primary games, the gaming system reports the results of these games as a first primary game played at a first point in time, followed by a second primary game played at a second, subsequent point in time, followed by a third primary game played at a third, subsequent point in time and finally followed by a fourth primary game played at a fourth, subsequent point in time. As illustrated by this example, such a configuration enables certain gaming device accounting systems (which are not configured to support a player placing a plurality of wagers on a plurality of simultaneous or concurrent plays of a plurality of primary games) to support a player placing a plurality of wagers on a plurality of simultaneous or concurrent plays of a plurality of primary games. Accordingly, gaming establishment operators using these types of gaming device accounting systems are enabled to offer similar simultaneous game play features to players and are thus not at any disadvantage to other gaming establishment operators using different gaming device accounting systems.

More specifically, in one embodiment, the gaming system disclosed herein enables a player to wager on a plurality of overlapping game plays. For each of the simultaneous or overlapping game plays, the gaming system generates an outcome, displays the generated outcome, provides the player any award associated with the generated outcome, and escrows accounting data associated with the simultaneously displayed game. In this embodiment, after escrowing accounting data associated with each of the overlapping game plays, for each of the overlapping game plays, the gaming system sequentially communicates the escrowed accounting data to a remote host, wherein the escrowed accounting data is communicated as if the plurality of overlapping game plays were a plurality of sequential or non-overlapping game plays.

The present disclosure additionally or alternatively relates generally to gaming systems, gaming devices, and methods which enable a player to simultaneously play a plurality of games wherein certain of the games are eligible to operate with a remote host and certain of the games are ineligible to operate with the remote host.

In various other embodiments, the gaming system, gaming device and method disclosed herein enables a player to wager on and simultaneously, concurrently or overlappingly play a plurality of primary or base games. In this embodiment, the gaming system causes one or more of the simultaneously played games to be associated with at least one central server, central controller or remote host initiated feature or request and causes one or more of the simultaneously played games to not be associated with any central server, central controller or remote host initiated features or requests. Put differently, the gaming system displays a plurality of simultaneously played games wherein at least one of the simultaneously played games enables at least one central server, central controller or remote host initiated feature to modify or otherwise alter one or more aspects of the play of that game and at least one of the simultaneously played games prohibits any central server, central controller or remote host initiated features from modifying or otherwise altering any aspects the play of that game. Such a configuration moderates the affects of gaming server, gaming controller or gaming remote host initiated features or requests and provides gaming device designers more predictability when configuring these gaming devices.

More specifically, in one embodiment, the gaming system disclosed herein enables a player to wager on a plurality of overlapping game plays, wherein one of the overlapping game plays is enabled to accept at least one feature initiated from a remote host and at least one of the overlapping game plays is disabled from accepting any features initiated from any remote hosts. The gaming system of this embodiment determines if the remote host initiated a feature in association with the plurality of overlapping game plays. If the remote host initiated the feature in association with the plurality of overlapping game plays, for each of the overlapping game plays enabled to accept the feature initiated from the remote host, the gaming system modifies a parameter of the played game, the modification based on the remote host initiated feature, generates an outcome, displays the generated outcome, determines any awards associated with the generated outcome, and displays any determined awards, wherein at least one of the generated outcome, the display of the generated outcome, any determined award and the display of any determined award is based, at least in part, on the modified parameter of the played game. Additionally, if the remote host initiated the feature in association with the plurality of overlapping game plays, for each of the at least one of the overlapping game plays disabled from accepting the feature initiated from the remote host, the gaming system does not modify any parameters of the played game based on the remote host initiated feature, generates an outcome, displays the generated outcome, determines any awards associated with the generated outcome, and displays any determined awards.

Accordingly, the gaming system disclosed herein provides additional functionality to certain gaming device accounting systems by enabling such gaming device accounting systems to support a plurality of simultaneous or concurrent plays of a plurality of primary games. The gaming system disclosed herein additionally or alternatively provides increased predictability to gaming device designers by minimizing one or more gaming server, gaming controller or gaming remote host initiated features or requests which increases the chances that a player's gaming device experience will mirror how the gaming device designer intended the player to experience the gaming device.

Additional features and advantages are described herein, and will be apparent from the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling or executing any games are executed by at least one central server, central controller, or remote host. In such a "thin client" embodiment, the central server remotely controls or executes any games (or other suitable interfaces) and the gaming device is utilized to display such games (or suitable interfaces) and receive one or more inputs or commands from a player. That is, in a "thin client" configuration, the game execution and outcome are determined by the central server and only "User Interface Display" and "User Interface Input" states are transmitted to and from the gaming terminal.

In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable user interfaces) provided to a player. That is, in a "thick client" configuration, the execution, outcomes, user interface display states and user interface input states are all managed by the local game processor and subsequently all game state changes need to be transferred to the central server via one or more system interfaces.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
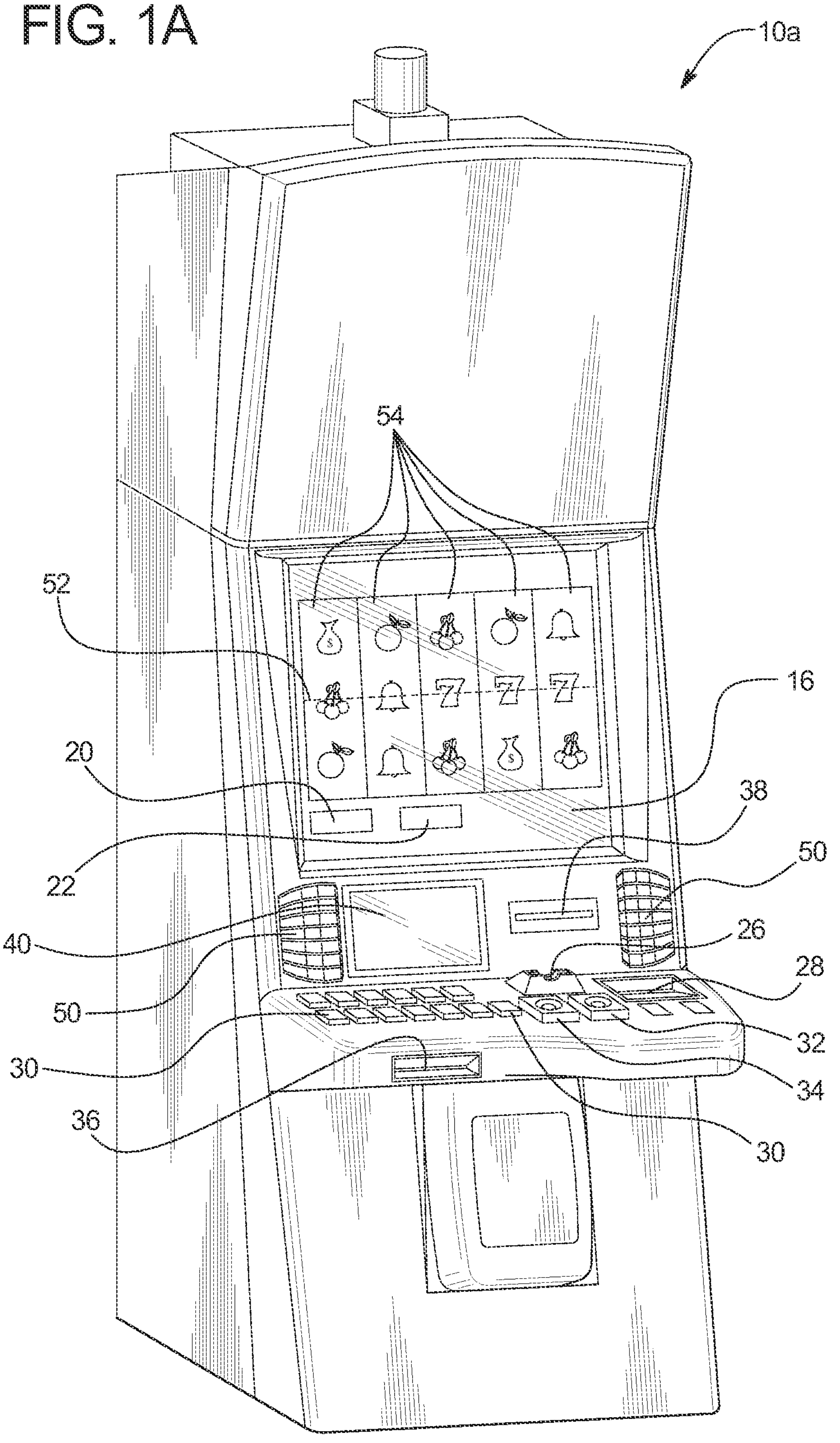
FIG. 1A is a front-side perspective view of one embodiment of the gaming device disclosed herein.
Figure 1B:
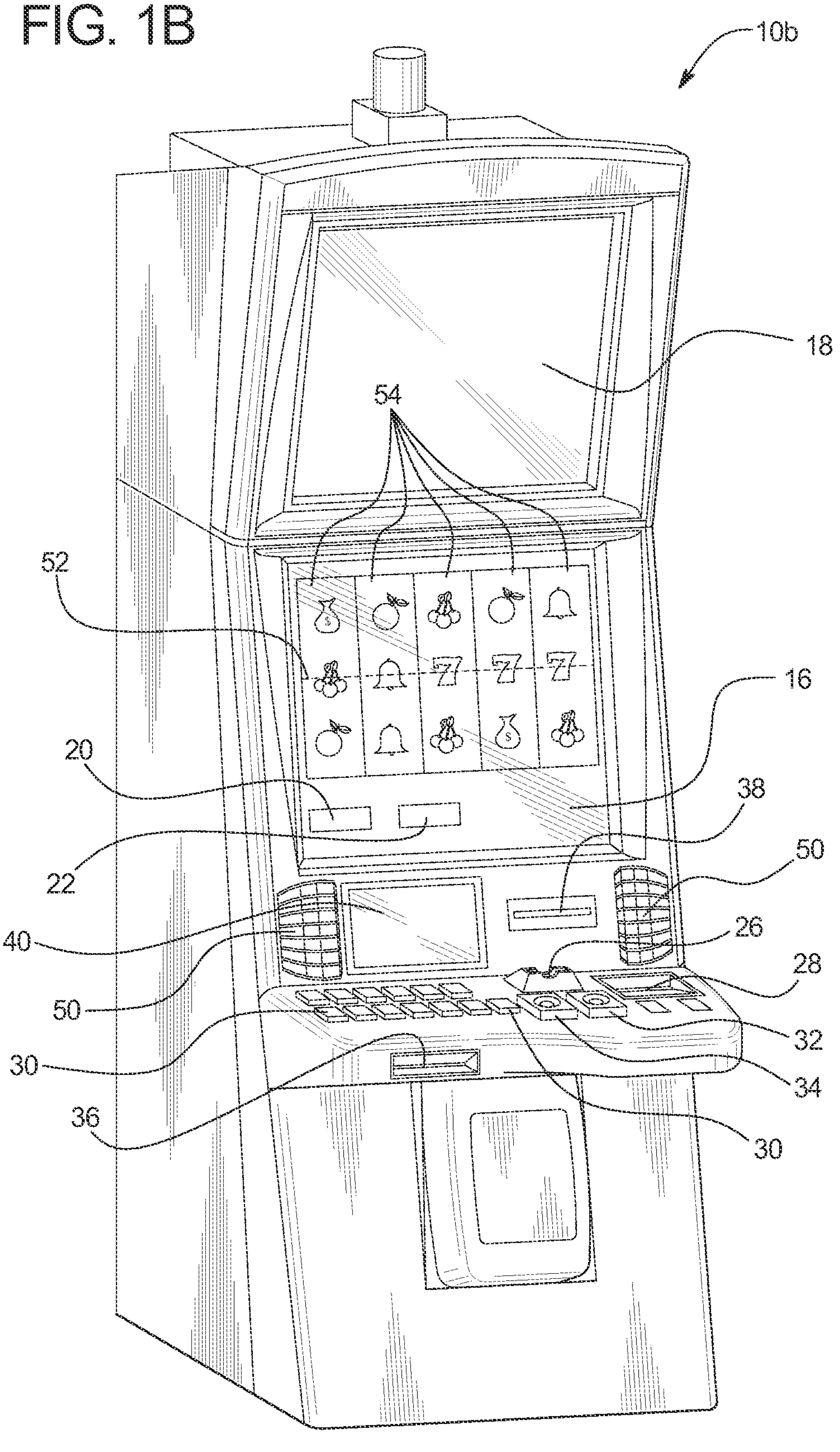
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
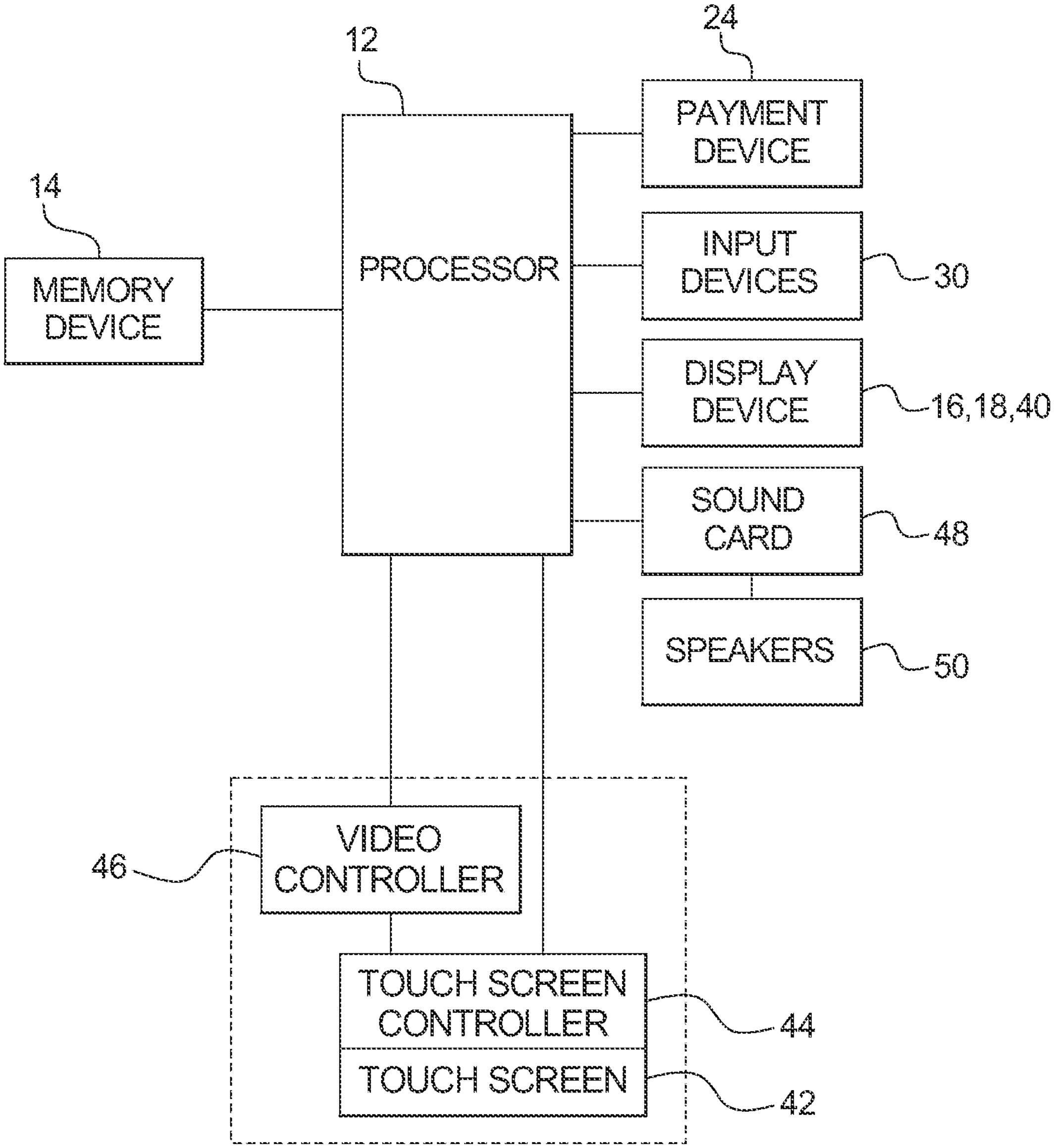
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, a non-transitory computer readable medium, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control or executes the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. In one such embodiment, a gaming device accounting system (as described in more detail below) interfaces with such wireless devices by utilizing one or more "rack mounted SMIBs" for each mobile gaming device. That is, because such wireless devices do not include a SMIB typically installed in a traditional gaming device (i.e., a person's smart phone does not include the same SMIB of an electronic gaming machine), a plurality of SMIBs are housed in a location, wherein such SMIBs function as the SMIBs of such wireless devices. For example, if a gaming system includes three-hundred mobile gaming devices, then at least three-hundred SMIBs are rack mounted in a server room and the server communicates with the gaming device accounting system over three-hundred separate channels. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device or outcome server flags or removes the provided award or other game outcome from the predetermined set or pool. Once flagged or removed from the set or pool, the specific provided award or other game outcome from that specific pool cannot be provided to a player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server draws the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may also display a primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or by the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
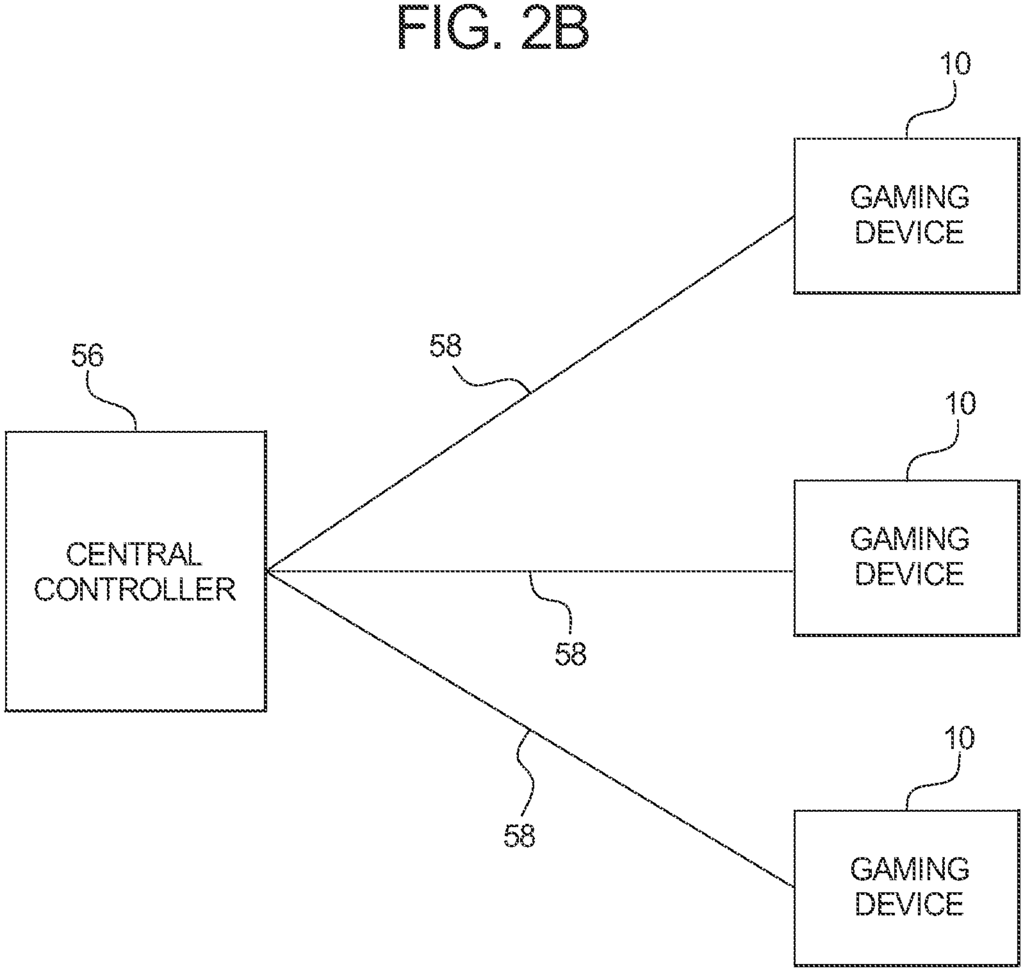
FIG. 2B is a schematic block diagram illustrating a plurality of gaming devices in communication with a central controller.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions. In one embodiment, the gaming network includes a real-time or on-line analytics system. The analytics system executes extensive analysis on the game or cabinet performance and may make recommendations to operators about which themes/paytables, or cabinets to place in order to increase the level of excitement and enjoyment for certain players or demographics of players. In another embodiment, the gaming network includes a real-time or on-line responsible gaming system which monitors designated players to determine if such players comply with one or more pre-defined rules or regulations.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology, ticket technology or player authentication device (e.g., a player's username and password) to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows, media displays, or player user interface windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed.

In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, for a group or community cooperation game, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, for a group or community competition game, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Simultaneous Game Play with Sequential Reporting

Figure 3:
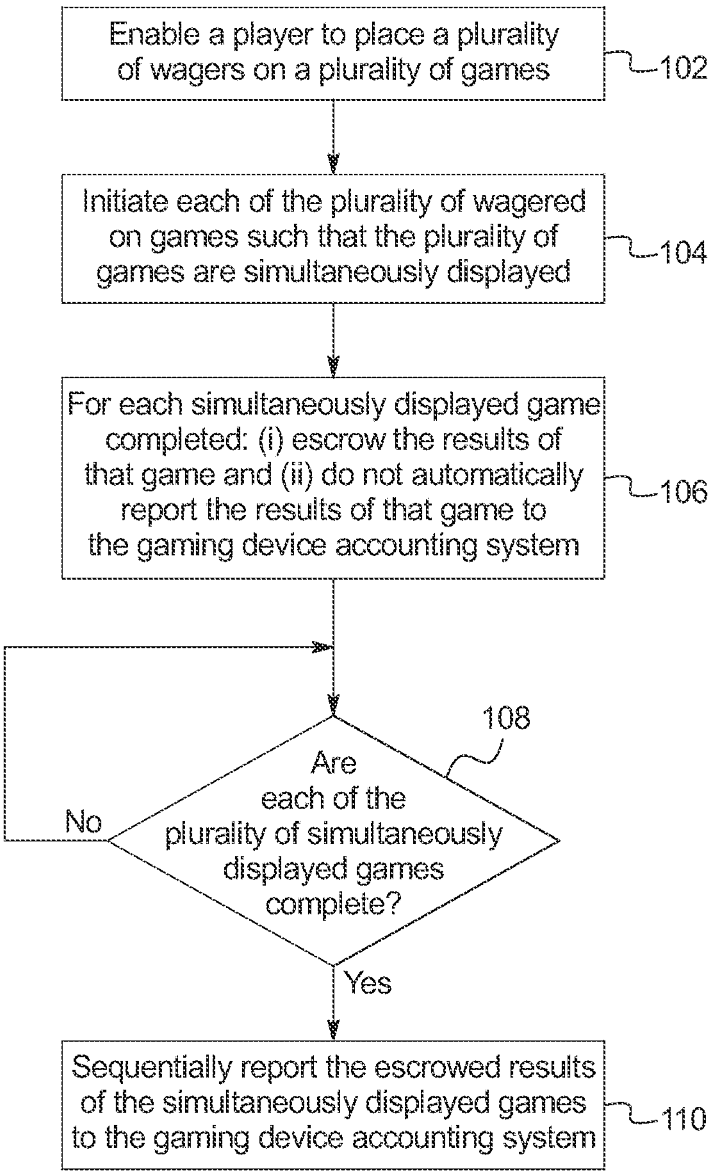
FIG. 3 is a flowchart of one embodiment of the gaming system disclosed herein illustrating the simultaneous play of a plurality of games and the sequential reporting of those games to a gaming device accounting system.

Referring now to FIG. 3, a flowchart of an example embodiment of a process for operating a gaming system, a gaming server or a gaming device disclosed herein is illustrated. In one embodiment, this process is embodied in one or more software programs stored in one or more memories and executed by one or more processors or one or more servers. Although this process is described with reference to the flowchart illustrated in FIG. 3, it should be appreciated that many other methods of performing the acts associated with this process may be used. For example, the order of certain steps described may be changed, or certain steps described may be optional.

In various embodiments, the gaming system enables a player to place a plurality of wagers on a plurality of games as indicated in block 102. After wagering on a plurality of games, the gaming system initiates each of the plurality of wagered on games such that the plurality of games are simultaneously played as indicated in block 104.

Figure 4A:
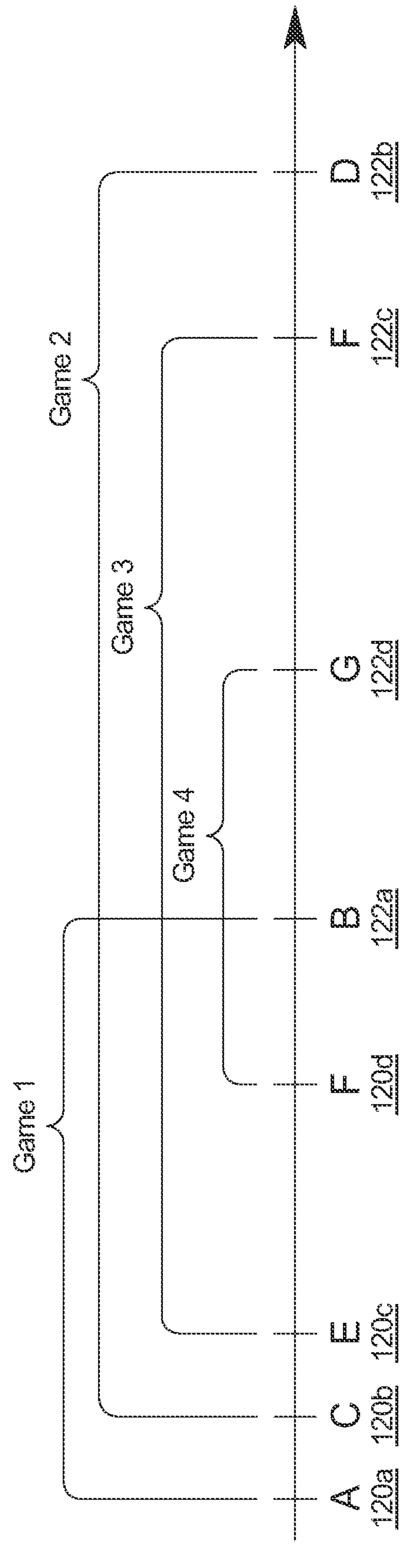
FIG. 4A is a timeline of one embodiment of the gaming system disclosed herein illustrating a plurality of games simultaneously being played at a gaming device.

In one embodiment, the gaming system initiates and displays each of the plurality of games simultaneously, substantially simultaneously or overlappingly. In another embodiment, the gaming system initiates two or more of the plurality of games simultaneously or substantially simultaneously and initiates (but does not complete) two of more of the plurality of games sequentially or substantially sequentially. In another embodiment, the gaming system initiates (but does not complete) each of the plurality of games sequentially. For example, as seen in FIG. 4A, the gaming system initiates a first game (i.e., Game 1) at a first point in time (i.e., point-in-time A 120*a*), initiates a second game (i.e., Game 2) at a second, subsequent point in time (i.e., point-in-time C 120*b*), initiates a third game (i.e., Game 3) at a third, subsequent point in time (i.e., point-in-time E 120*c*) and initiates a fourth game (i.e., Game 4) at a fourth, subsequent point in time (i.e., point-in-time F 120*d*). It should be appreciated that regardless of if the gaming system initiates a plurality or each of the games at one time or at different times, the plays of the plurality of games overlap such that the gaming system provides the player a plurality of simultaneously played games. For example, as illustrated in FIG. 4A, despite the first game (i.e., Game 1), the second game (i.e., Game 2), the third game (i.e., Game 3) and the fourth game (i.e., Game 4) all being initiated at different points in time, for a designated duration or period of time (i.e., between point in time F of the initiation of the fourth game and point in time B of the conclusion of the first game), each of the plurality of plays are simultaneously played by the player. That is, as seen in FIG. 4A, at least a portion of each of the games are simultaneously displayed to the player.

As described above, for each initiated game, the gaming system generates and displays an outcome for the play of that game. The gaming system also determines, displays and provides any award associated with the generated outcome for each initiated game. Moreover, as described above, if any secondary or bonus games are triggered in association with the play of one or more of the initiated games, for that initiated game, the gaming system determines an outcome for the triggered secondary game and provides the player any award associated with the determined outcome of the triggered secondary game. In this embodiment, upon the gaming system providing the player any awards associated with the outcome generated in the initiated game and any outcomes generated in any triggered secondary games, the gaming system determines that that initiated game is complete. That is, each of the plurality of simultaneously played games are complete after the gaming system generates an outcome for each initiated game, provides any awards associated with the generated outcome for each initiated game, triggers any bonus or secondary games in association with each initiated game, generates any outcomes in any triggered bonus or secondary games and provides any awards associated with any generated outcomes in any triggered bonus or secondary games. In other words, each initiated game is considered complete when no additional outcome determinations or award determinations remain to be made in association with each play of each initiated game (or any secondary games triggered from these initiated games) and the results of such games are ready to be reported to a gaming device accounting system.

After initiating each of the plurality of games, for each simultaneously played game completed, the gaming system escrows the results of that game and does not automatically report the results of that game to the gaming device accounting system as indicated in block 106. That is, unlike certain known gaming systems which automatically report the results of each completed game to the gaming device accounting system, the gaming system disclosed herein holds off on reporting the results of each completed game until a subsequent point in time. In one such embodiment, the gaming system maintains a record for each completed game. In this embodiment, each record is associated with data or information including, but not limited to, a type of game played, a time the game started, a time the game completed, an amount of the wager placed on the game, an outcome generated in the game, any award provided to the player for the game.

Following the escrowing of the results of each completed game, the gaming system determines if each of the plurality of simultaneously played games are complete as indicated in diamond 108.

In one embodiment, the gaming system concludes or completes each of the plurality of games simultaneously or substantially simultaneously. In another embodiment, the gaming system concludes or completes two or more of the plurality of games simultaneously or substantially simultaneously and concludes or completes two of more of the plurality of games sequentially or substantially sequentially. In another embodiment, the gaming system concludes or completes each of the plurality of games sequentially. For example, as seen in FIG. 4A, the gaming system completes the first game (i.e., Game 1) at a fifth point in time (i.e., point-in-time B 122*a*), completes the second game (i.e., Game 2) at a sixth, different point in time (i.e., point-in-time D 122*b*), completes the third game (i.e., Game 3) at a seventh, different point in time (i.e., point-in-time F 122*c*) and completes the fourth game (i.e., Game 4) at a eighth, different point in time (i.e., point-in-time G 122*d*).

If each of the plurality of simultaneously played games are not complete, the gaming system returns to diamond 108 and again determines if each of the plurality of simultaneously played games are complete. That is, if at least one of the simultaneously played games (or a secondary game triggered in association with any of the wagered on primary games) is still being played, the gaming system continues with the play of that game as described above. For example, as seen in FIG. 4A, at any point in time prior to the completion of the second game (i.e., Game 2), at least the second game is being played and thus each of the plurality of games are not complete.

On the other hand, if each of the plurality of simultaneously played games are complete, the gaming system sequentially reports the escrowed results of these simultaneously played games to the gaming device accounting system as indicated in block 110. That is, the gaming system stores the game play and/or accounting data or information for a plurality of played game in one or more memory devices of the gaming system and then plays such game play and/or accounting data or information back to a gaming device accounting system (which is a separate and distinct system from the gaming system) as if these played games were played sequentially (instead of how such games were actually simultaneously played). Put differently, at the completion of the plurality of simultaneously played games, the gaming system serializes the plays of these games and presents such games to the gaming device accounting system as if they were played sequentially with an applicable game switch between each played game. Thus, despite the plurality of games actually being played simultaneously, the gaming system transfers data or information to the gaming device accounting system such that the gaming device accounting system determines (or at least perceives to determine) that these simultaneously played games were played sequentially.

Figure 4B:
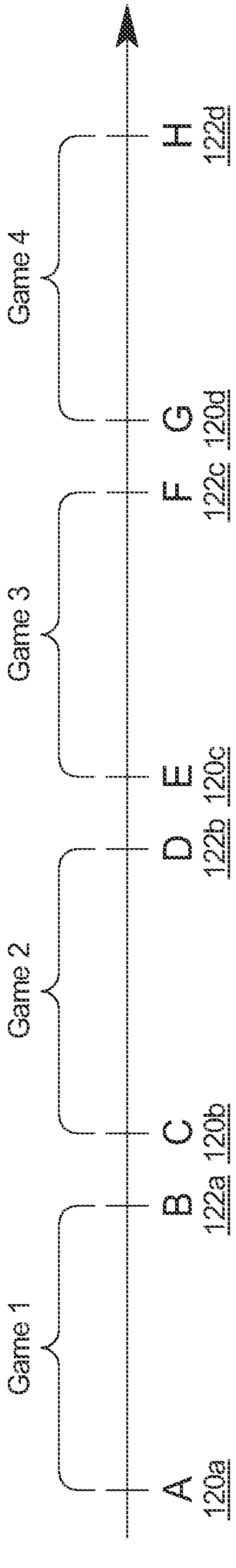
FIG. 4B is a timeline of one embodiment of the gaming system disclosed herein illustrating the order which the plurality of games of FIG. 4A are sequentially reported to the gaming device accounting system.

For example, as seen in FIG. 4B, when reporting the results of the four simultaneously played games of FIG. 4A to the gaming device accounting system, amongst other statistical information reported to the gaming device accounting system, the gaming system reports that:

(i) a first game (i.e., Game 1) was initiated at a first point in time (i.e., point-in-time A 120*a*) and completed at a second, subsequent point in time (i.e., point-in-time B 122*a*), (ii) following the play of this first game, a separate or distinctly played second game (i.e., Game 2) was initiated at a third point in time (i.e., point-in-time C 120*b*) and completed at a fourth, subsequent point in time (i.e., point-in-time D 122*b*), (iii) following the play of this second game, a separate or distinctly played third game (i.e., Game 3) was initiated at a fifth point in time (i.e., point-in-time D 120*c*) and completed at a sixth, subsequent point in time (i.e., point-in-time E 122*c*), and (iv) following the play of this third game, a separate or distinctly played fourth game (i.e., Game 4) was initiated at a seventh point in time (i.e., point-in-time F 120*d*) and completed at a eighth, subsequent point in time (i.e., point-in-time G 122*d*).

In another embodiment, the gaming system waits until all previously started overlappingly played games are complete before any game start or game end messaging is communicated to the gaming device accounting system. In another embodiment, the gaming system enables one or more games to be initiated before all of the previously initiated overlappingly played game are complete. In one such embodiment, the gaming system is configured to report the results of each game in the order such games are initiated. For example, if game 1 is initiated, game 2 is initiated, game 3 is initiated, game 2 completes, game 4 is initiated, and game 1 completes. In this example, at this point, the gaming system reports the results of games 1 and 2 to the gaming device accounting system, even though games 3 and 4 are still in play. In another such embodiment, the gaming system is configured to report the results of each game as such games are completed. For example, if game 1 is initiated, game 2 is initiated, game 3 is initiated, and game 2 completes. In this example, at this point, the gaming system reports the results of game 2 to the gaming device accounting system even though games 1 and 3 are still in play. In another embodiment, the gaming system accounts for timing issues, such as the need to report which game is currently being played and allow sufficient time for the gaming system to register that change before reporting any plays of that game.

In another embodiment, the gaming system enables one or more "mid-game" wagers or bets to be placed in association with one or more games played. Such "mid-game" wagers or bets are wagers which are made in addition to the wager which initiated the play of the game (e.g., a wager to split cards in a blackjack game or a wager to double-down in a blackjack game). In this embodiment, the gaming system delays the reporting of any game starts until the final outcome for the play of the started game is determined. This causes the game start messaging and the game end messaging to be communicated to the gaming device accounting system as back-to-back messages. It should be appreciated that in this embodiment, even if the game start and game end messaging are communicated as back-to-back messages for any individual game played, when a plurality of such games are overlappingly played, the gaming system reports the results of such overlappingly played games as a plurality of sequentially played game.

Accordingly, as illustrated in these examples, to accommodate certain gaming device accounting systems that are not configured to support a player simultaneously or concurrently playing a plurality of games, the gaming system disclosed herein reports the results of such simultaneously, overlappingly or concurrently played games as the results of a plurality of sequentially played games. That is, despite any time differences between a gaming device accounting system's polling rate and the time it takes for a gaming device to report a game change event, the gaming system disclosed herein enables bulk reporting of games played after any game change events. Such a configuration thus enables certain gaming device accounting systems (which are not configured to support a player placing a plurality of wagers on a plurality of simultaneous or concurrent plays of a plurality of primary games) to support a player placing a plurality of wagers on a plurality of simultaneous or concurrent plays of a plurality of primary games. By overcoming this limitation associated with certain known gaming device accounting systems, the gaming establishment operators using these gaming device accounting systems are enabled to offer similar simultaneous game play features to players and are thus not at any disadvantage to other gaming establishment operators using different gaming device accounting systems.

Selective Activation of System Initiated Features

Figure 5:
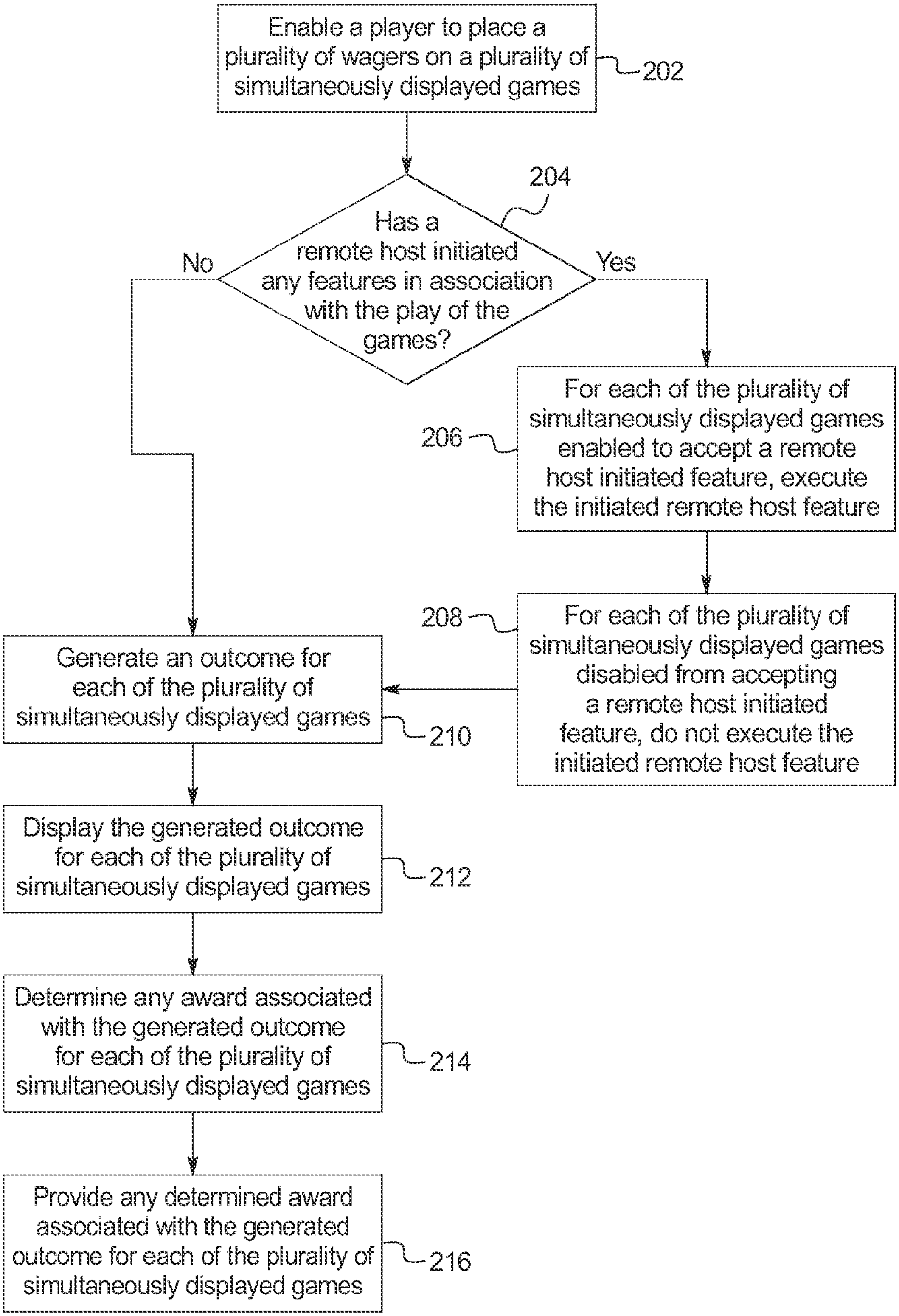
FIG. 5 is a flowchart of another embodiment of the gaming system disclosed herein illustrating the simultaneous play of a plurality of games wherein different games are enabled/disabled from responding to any remote host initiated features or requests.

Referring now to FIG. 5, a flowchart of an additional or alternative example embodiment of a process for operating a gaming system, a gaming server or a gaming device disclosed herein is illustrated. In one embodiment, this process is embodied in one or more software programs stored in one or more memories and executed by one or more processors or one or more servers. Although this process is described with reference to the flowchart illustrated in FIG. 5, it should be appreciated that many other methods of performing the acts associated with this process may be used. For example, the order of certain steps described may be changed, or certain steps described may be optional.

Figure 6:
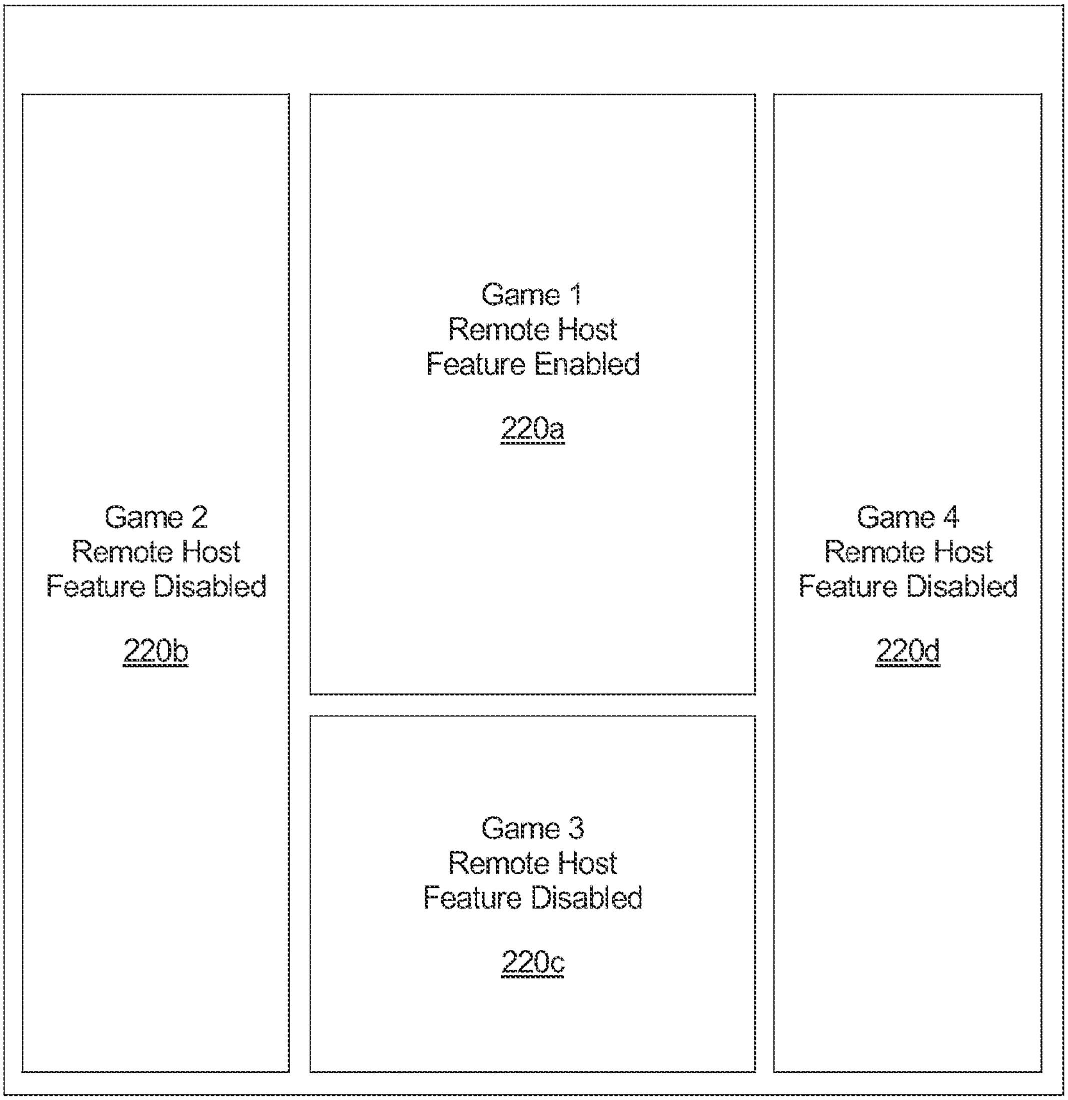
FIG. 6 is a front view of one example of a game play screen of a gaming device disclosed herein illustrating how certain of the simultaneously played games are associated with a remote host initiated feature and certain of the simultaneously played games are not associated with any remote host initiated features.

In various embodiments, the gaming system enables a player to place a plurality of wagers on a plurality of simultaneously played games as indicated in block 202. In these embodiments, as also indicated in block 202, the gaming system: enables at least one of the simultaneously played games for at least one central server, central controller or remote host initiated feature, command or request and disables at least one of the simultaneously played games from any central server, central controller or remote host initiated features or requests. For example, as seen in FIG. 6, the gaming system enables a player to wager on and simultaneously play four distinct games (i.e., Game 1 220*a*, Game 2 220*b*, Game 3 220*c* and Game 4 220*d*). In this example: (i) one of the games (i.e., Game 1 220*a*) is enabled to accept or operate in conjunction with one or more remote host initiated features or requests, and (ii) three of the games (i.e., Game 2 220*b*, Game 3 220*c* and Game 4 220*d*) are each disabled (i.e., currently incapable of) from accepting or operating in conjunction with any remote host initiated features or requests.

In one embodiment, a remote host initiated feature, remote host command or request includes a feature or request which modifies one or more game play aspects or parameters of at least one of the plays of at least one of the games being played, such as a feature which reconfigures a paytable utilized for a play of a game. In one such embodiment, if a game is being actively played, then any modification of one or more game play aspects or parameters are held or saved until the game is no longer being actively played (e.g., when the game is idle or inactive for a designated period of time). In another such embodiment, if a game is being actively played, then the gaming system determines whether to implement or hold such a modification based on if the modification benefits the player (e.g., increases the average expected payback percentage of the paytable utilized) or does not benefit the player (e.g., decreases the average expected payback percentage of the paytable being used). In this embodiment, if such a modification does not provide a benefit to the player, then such a modification occurs between played games (i.e., not to any previously wagered on games) or between played gaming sessions (i.e., not while a game is active). On the other hand, if such a modification provides a benefit to the player, then such a modification may occur between played games, between gaming sessions or in association with one or more currently wagered on games.

In another embodiment, a remote host initiated feature, remote host command or remote host request includes a feature or request which maintains one or more game play aspects or parameters of at least one of the plays of at least one of the games being played, but otherwise requests the gaming device to execute or perform a task, such as a request for information or data regarding one or more events which occurred during a designated period of time. It should be appreciated such tasks are either unrelated to the player or authorized by the player.

After the player wagers on each of the plurality of simultaneously played games, the gaming system determines if a remote host has initiated any features in association with the play of the games as indicated in diamond 204 of FIG. 5. That is, the gaming system determines if the remote host has communicated any commands to the individual gaming device regarding the simultaneously played games.

If the remote host has initiated at least one feature in association with play of the plurality of simultaneously played games, for each of the played games that is enabled to accept a remote host initiated feature, the gaming system executes or otherwise implements the initiated remote host feature as indicated in block 206. In a first example, if Game 1 of FIG. 6 is a slot game that is enabled to accept a remote host initiated feature or request and the remote host initiated feature or request is a reconfiguration of the paytable utilized for one play of a game, the gaming system executes or implements this remote host initiated feature or request by reconfiguring the paytable of Game 1. In a second example, if Game 1 of FIG. 6 is a slot game that is enabled to accept a remote host initiated feature or request and the remote host initiated feature or request is a request for data or information from the gaming device, the gaming system executes or implements this remote host initiated feature or request by providing the requested data or information to the remote host. It should be appreciated that in this example, the providing of the requested data or information may cause the reels of the slot game to spin for a longer duration which alters or otherwise interferes with the play of this slot game.

Moreover, if the remote host has initiated at least one feature in association with play of the plurality of simultaneously played game, for each of the played games that is disabled from accepting a remote host initiated feature, the gaming system does not execute or otherwise implement the initiated remote host feature as indicated in block 208 of FIG. 5. That is, to moderate the affect that remote host initiated features have on a player's gaming experience, the gaming system is configured to ignore or otherwise disregard the remote host initiated features for one or more of the simultaneously played games. Building on the first example described above, if Game 2 of FIG. 6 is a slot game that is disabled from accepting a remote host initiated feature or request and the remote host initiated feature or request is a reconfiguration of the paytable utilized for one play of a game, the gaming system ignores this remote host initiated feature or request and does not reconfigure the paytable of Game 2. Building on the second example described above, if Game 2 of FIG. 6 is a slot game that is disabled from accepting a remote host initiated feature or request and the remote host initiated feature or request is a request for data or information from the gaming device, the gaming system ignores this remote host initiated feature or request. It should be appreciated that in this second example, the gaming system's disregard of the requested data or information does not alter the duration which the reels of the slot game will spin and thus does not alter or otherwise interfere with the play of this slot game.

After: (i) executing the initiated remote host feature for certain of the simultaneously played games and not executing the initiated remote host feature for certain other of the simultaneously played games, or (ii) if no remote host feature is initiated, the gaming system generates and displays an outcome for each of the plurality of simultaneously played games as indicated in blocks 210 and 212 of FIG. 5. The gaming system then determines any award associated with the generated outcome for each of the plurality of simultaneously played games and provides the player any determined award associated with the generated outcome for each of the plurality of simultaneously played games as indicated in block 214 and 216. Following the providing of any determined awards, the gaming system returns to block 202 and again enables the player to place a plurality of wagers on a plurality of simultaneously played displayed games.

It should be appreciated that when generating the outcome for each of the plays of the simultaneously played games, the gaming system accounts for any remote host initiated features that modify any determinations associated with the play of that game. That is, if a remote host initiates a feature in association with a plurality of simultaneous plays of a plurality of games and the initiated remote host feature is associated with a modification of the play of such games, for each of the simultaneously played games that is configured to respond to the initiated remote host feature, the play of that game is modified based on the initiated remote host feature. For example, if Game 1 of FIG. 6 is a slot game that is enabled to accept a remote host initiated feature or request, the remote host initiated feature or request is a modifier of 2× to any awards associated with any generated outcomes and the gaming system generates a symbol combination of cherry-cherry-cherry associated with an award of $10 for the play of this game, the gaming system applies the modifier of 2× (from the remote host initiated feature) to this award of $10 to provide the player an award of $20.

In one embodiment, each of the simultaneously played games are associated with an application programming interface. In this embodiment, the application programming interface enables both the simultaneously played games that are enabled to accept a remote host initiated feature and the simultaneously played games that are disabled from accepting any remote host initiated features to synchronize with each other.

As described above, in one embodiment, a remote host initiated feature or request includes the modification or reconfiguration of one or more parameters or aspects of a player's play of a game. In different such embodiments, the remote host initiated feature or request includes, but is not limited to:

(i) a modification of an amount of credits of a credit balance;
(ii) a modification of an amount of promotional credits;
(iii) a modification of a placed wager amount;
(iv) a modification of a wager amount available to be placed;
(v) a modification of a placed side wager amount;
(vi) a modification of a side wager amount available to be placed;
(vii) a modification of a number of wagered on paylines;
(viii) a modification of a number of paylines available to be wagered on;
(ix) a modification of a wager placed on one or more paylines (or on one or more designated paylines);
(x) a modification of a number of ways to win wagered on;
(xi) a modification of a number of available ways to win to be wagered on;
(xii) a modification of a wager placed on one or more ways to win (or on one or more designated ways to win);
(xiii) a modification of a paytable utilized for a play of a game;

(xiv) a modification of an average expected payback percentage of a play of a game;
(xv) a modification of one or more awards available;
(xvi) a modification of a range of awards available;
(xvii) a modification of a type of awards available;
(xviii) a modification of one or more progressive awards;
(xix) a modification of one or more modifiers, such as multipliers, available;
(xx) a modification of an activation of a reel (or a designated reel);
(xxi) a modification of an activation of a plurality of reels;
(xxii) a modification of a generated outcome (or a designated generated outcome);
(xxiii) a modification of a generated outcome (or a designated generated outcome) associated with an award over a designated value;
(xxiv) a modification of a generated outcome (or a designated generated outcome) on a designated payline;
(xxv) a modification of a generated outcome (or a designated generated outcome) in a scatter configuration;
(xxvi) a modification of a winning way to win (or a designated winning way to win);
(xxvii) a modification of a designated symbol or symbol combination;
(xxviii) a modification of a generation of a designated symbol or symbol combination on a designated payline;
(xxix) a modification of a generation of a designated symbol or symbol combination in a scatter configuration;
(xxx) a modification of a triggering event of a play of a secondary or bonus game;
(xxxi) a modification of an activation of a secondary or bonus display (such as an award generator);
(xxxii) a modification of an activation of a community award generator;
(xxxiii) a modification of a generated outcome (or a designated generated outcome) in a secondary game;
(xxxiv) a modification of an amount of free spins provided;
(xxxv) a modification of a game terminating or ending condition;
(xxxvi) a modification of how one or more aspects of one or more games (e.g., colors, speeds, sound) are displayed to a player;
(xxxvii) a modification of any game play feature associated with any play of any game disclosed herein.

As described above, in another embodiment, a remote host initiated feature or request includes a feature or request which maintains one or more game play parameters or aspects of at least one of the plays of at least one of the games being played, but otherwise requests the gaming device to execute or perform a task. In different such embodiments, the remote host initiated feature or request includes, but is not limited to:

(i) a request for information or data from a remote host;
(ii) a delivery of information or data from a remote host to a gaming device;
(iii) a request for information or data from a player tracking system;
(iv) a delivery of information or data from a payer tracking system to a gaming device;
(v) a request for information or data from a progressive award controller;
(vi) a delivery of information or data from a progressive award controller to a gaming device;
(vii) a request for information or data from a gaming device accounting system;
(viii) a delivery of information or data from a gaming device accounting system to a gaming device;
(ix) an identification of a player;
(x) a deposit of funds to a gaming device;
(xi) a withdrawal of funds from a gaming device;
(xii) a transfer of funds between a gaming device and another entity;
(xiii) a reallocation of network resources;
(xiv) a reconfiguration of a network;
(xv) a downloading of new software;
(xvi) a downloading of updated software;
(xvii) a communication from another player;
(xviii) a communication from a gaming establishment or a representative of a gaming establishment;

Additional/Alternative Embodiments

In one embodiment, each of the plurality of simultaneously played games are the same type of game. In another embodiment, each of the plurality of simultaneously played games are different types of games. In another embodiment, at least two of the plurality of simultaneously played games are the same type of game and at least two of the plurality of simultaneously played games are different types of games. In different embodiments, one or more of the simultaneously played games include, but are not limited to: any suitable slot game, any suitable free spins or free activations game, any suitable wheel game, any suitable card game, any suitable keno game, any suitable bingo game, any suitable die or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, or any other suitable type of game.

In one embodiment, the gaming system utilizes a single display device, such as central display device 16 or upper display device 18, to display each of the plurality of simultaneously played games. In another embodiment, utilizes a plurality of display devices, such as central display device 16 and upper display device 18, to display the plurality of simultaneously played games. In another embodiment, the gaming system utilizes one or more service windows, media displays, or player user interface windows, such as the service windows described in U.S. Published Patent Application No. 2007/0243934, U.S. Published Patent Application No. 2007/0243928, U.S. Published Patent Application No. 2008/0009344, U.S. Published Patent Application No. 2009/0104954, and/or U.S. Published Patent Application No. 2009/0233705, to display one or more of the plurality of simultaneously played games.

It should be appreciated that in different embodiments, one or more of:

(i) which games or types of games a player is enabled to simultaneously play;
(ii) a quantity of games a player is enabled to simultaneously play;
(iii) how the plurality of simultaneously played games are displayed to a player;
(iv) the order the results of the simultaneously played games are sequentially reported to the gaming device accounting system;
(v) which games are enabled to accept a remote host initiated feature or request;
(vi) which games are enabled to accept which remote host initiated features or requests;

(vii) a quantity of games enabled to accept a remote host initiated feature or request;

(viii) which games are disabled from accepting any remote host initiated features or requests;

(ix) which games are disabled from accepting which remote host initiated features or requests;

(x) a quantity of games disabled from accepting any remote host initiated features or requests;

(xi) which remote host features or requests are initiated and communicated from the remote host;

(xii) a quantity of remote host features or requests initiated and communicated from the remote host;

(xiii) when a remote host feature or request is initiated and/or communicated;

(xiv) any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the display device and the at least one input device to:

(a) enable a player to wager on a plurality of overlapping game plays, wherein one of the overlapping game plays is enabled to accept at least one feature initiated from a remote host and at least one of the overlapping game plays is disabled from accepting any features initiated from any remote hosts;

(b) determine if the remote host initiated a feature in association with the plurality of overlapping game plays; and (c) if the remote host initiated the feature in association with the plurality of overlapping game plays:

(i) for each of the overlapping game plays enabled to accept the feature initiated from the remote host:

(A) modify a parameter of the played game, the modification based on the remote host initiated feature, (B) generate an outcome, (C) display the generated outcome, (D) determine any awards associated with the generated outcome, and (E) display any determined awards, wherein at least one of the generated outcome, the display of the generated outcome, any determined award and the display of any determined award is based, at least in part, on the modified parameter of the played game, and (ii) for each of the at least one of the overlapping game plays disabled from accepting the feature initiated from the remote host:

(A) not modify any parameters of the played game based on the remote host initiated feature, (B) generate an outcome, (C) display the generated outcome, (D) determine any awards associated with the generated outcome, and (E) display any determined awards.

2. The gaming system of claim 1, wherein when executed by the at least one processor if the remote host did not initiate any feature in association with the plurality of overlapping game plays, the plurality of instructions cause the at least one processor to, for each of the overlapping game plays, not modify any parameters of the played game based on any remote host initiated features, generate an outcome, display the generated outcome, determine any awards associated with the generated outcome, and display any determined awards.

3. The gaming system of claim 1, wherein when executed by the at least one processor, the plurality of instructions cause the at least one processor to display at least one of the at least one of the overlapping game plays disabled from accepting any features initiated from any remote hosts to the player in a service window.

4. The gaming system of claim 1, wherein a plurality of the overlapping game plays are enabled to each accept at least one feature initiated from the remote host.

5. The gaming system of claim 1, wherein a plurality of the overlapping game plays are each disabled from accepting any features initiated from any remote hosts.

6. The gaming system of claim 1, wherein at least one of the overlapping game plays is enabled to accept at least one feature initiated from the remote host and disabled from accepting at least one feature initiated from the remote host.

7. A method of operating a gaming system, the method comprising:

(a) enabling a player to wager on a plurality of overlapping game plays, wherein one of the overlapping game plays is enabled to accept at least one feature initiated from a remote host and at least one of the overlapping game plays is disabled from accepting any features initiated from any remote hosts;

(b) causing at least one processor to execute a plurality of instructions to determine if the remote host initiated a feature in association with the plurality of overlapping game plays; and (c) if the remote host initiated the feature in association with the plurality of overlapping game plays:

(i) for each of the overlapping game plays enabled to accept the feature initiated from the remote host:

(A) causing the at least one processor to execute the plurality of instructions to modify a parameter of the played game, the modification based on the remote host initiated feature, (B) causing the at least one processor to execute the plurality of instructions to generate an outcome, (C) causing at least one display device to display the generated outcome, (D) causing the at least one processor to execute the plurality of instructions to determine any awards associated with the generated outcome, and (E) causing the at least one display device to display any determined awards, wherein at least one of the generated outcome, the display of the generated outcome, any determined award and the display of any determined award is based, at least in part, on the modified parameter of the played game, and (ii) for each of the at least one of the overlapping game plays disabled from accepting the feature initiated from the remote host:

(A) causing the at least one processor to execute the plurality of instructions to not modify any parameters of the played game based on the remote host initiated feature, (B) causing the at least one processor to execute the plurality of instructions to generate an outcome, (C) causing the at least one display device to display the generated outcome, (D) causing the at least one processor to execute the plurality of instructions to determine any awards associated with the generated outcome, and (E) causing the at least one display device to display any determined awards.

8. The method of claim 7, which includes, if the remote host did not initiate any feature in association with the plurality of overlapping game plays, for each of the overlapping game plays, not modifying any parameters of the played game based on any remote host initiated features, generate an outcome, display the generated outcome, determine any awards associated with the generated outcome, and display any determined awards.

9. The method of claim 7, which includes causing the at least one display device to display at least one of the at least one of the overlapping game plays disabled from accepting any features initiated from any remote hosts to the player in a service window.

10. The method of claim 7, wherein a plurality of the overlapping game plays are enabled to each accept at least one feature initiated from the remote host.

11. The method of claim 7, wherein a plurality of the overlapping game plays are each disabled from accepting any features initiated from any remote hosts.

12. The method of claim 7, wherein at least one of the overlapping game plays is enabled to accept at least one feature initiated from the remote host and disabled from accepting at least one feature initiated from the remote host.

13. The method of claim 7, which is provided through a data network.

14. The method of claim 13, wherein the data network is the internet.

15. A non-transitory computer readable medium including a plurality of instructions, which when executed by at least one processor, cause the at least one processor to:

(a) enable a player to wager on a plurality of overlapping game plays, wherein one of the overlapping game plays is enabled to accept at least one feature initiated from a remote host and at least one of the overlapping game plays is disabled from accepting any features initiated from any remote hosts;

(b) determine if the remote host initiated a feature in association with the plurality of overlapping game plays; and (c) if the remote host initiated the feature in association with the plurality of overlapping game plays:

(i) for each of the overlapping game plays enabled to accept the feature initiated from the remote host:

(A) modify a parameter of the played game, the modification based on the remote host initiated feature, (B) generate an outcome, (C) cause at least one display device to display the generated outcome, (D) determine any awards associated with the generated outcome, and (E) cause the at least one display device to display any determined awards, wherein at least one of the generated outcome, the display of the generated outcome, any determined award and the display of any determined award is based, at least in part, on the modified parameter of the played game, and (ii) for each of the at least one of the overlapping game plays disabled from accepting the feature initiated from the remote host:

(A) not modify any parameters of the played game based on the remote host initiated feature, (B) generate an outcome, (C) cause the at least one display device to display the generated outcome, (D) determine any awards associated with the generated outcome, and (E) cause the at least one display device to display any determined awards.

16. The non-transitory computer readable medium of claim 15, wherein when executed by the at least one processor if the remote host did not initiate any feature in association with the plurality of overlapping game plays, the plurality of instructions cause the at least one processor to, for each of the overlapping game plays, not modify any parameters of the played game based on any remote host initiated features, generate an outcome, display the generated outcome, determine any awards associated with the generated outcome, and display any determined awards.

17. The non-transitory computer readable medium of claim 15, wherein when executed by the at least one processor, the plurality of instructions cause the at least one processor to cause the at least one display device to display at least one of the at least one of the overlapping game plays disabled from accepting any features initiated from any remote hosts to the player in a service window.

18. The non-transitory computer readable medium of claim 15, wherein a plurality of the overlapping game plays are enabled to each accept at least one feature initiated from the remote host.

19. The non-transitory computer readable medium of claim 15, wherein a plurality of the overlapping game plays are each disabled from accepting any features initiated from any remote hosts.

20. The non-transitory computer readable medium of claim 15, wherein at least one of the overlapping game plays is enabled to accept at least one feature initiated from the remote host and disabled from accepting at least one feature initiated from the remote host.

* * * * *